United States Patent [19]

Murai et al.

[11] Patent Number: 5,032,904
[45] Date of Patent: Jul. 16, 1991

[54] COLOR IMAGE PROCESSING APPARATUS

[75] Inventors: Kazuo Murai, Tokyo; Nobuo Kasahara, Yokohama; Kenji Hashimoto, Tokyo, all of Japan

[73] Assignee: Ricoh Company, Ltd., Tokyo, Japan

[21] Appl. No.: 503,959

[22] Filed: Apr. 4, 1990

[30] Foreign Application Priority Data

Apr. 4, 1989 [JP] Japan .................................. 1-85289
Feb. 15, 1990 [JP] Japan .................................. 2-34490

[51] Int. Cl.$^5$ ...................... H04N 1/46; G03G 15/01
[52] U.S. Cl. ..................................... 358/75; 355/327; 382/17
[58] Field of Search ...................... 358/75, 76, 80, 78; 250/317.1, 318, 319; 382/22, 17; 355/326, 327

[56] References Cited

U.S. PATENT DOCUMENTS

| | | | |
|---|---|---|---|
| 4,700,399 | 10/1987 | Yoshida | 382/17 |
| 4,933,721 | 6/1990 | Yasuda et al. | 355/210 |
| 4,935,787 | 6/1990 | Maeda et al. | 355/326 |
| 4,953,013 | 8/1990 | Tsuji et al. | 358/75 |

Primary Examiner—Leo H. Boudreau
Assistant Examiner—Steven P. Klocinski
Attorney, Agent, or Firm—Oblon, Spivak, McClelland, Maier & Neustadt

[57] ABSTRACT

A color image processing apparatus for automatically feeding a plurality of documents one at a time and processing images printed on the documents. The apparatus automatically discriminates an image as to chromatic/achromatic without errors and thereby executes optimal image processing matching the kind of an image without resorting to operator's manipulations.

4 Claims, 13 Drawing Sheets

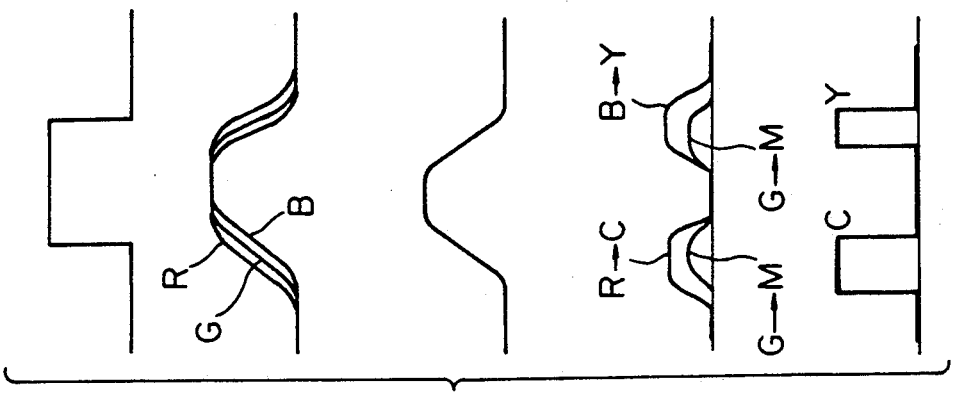
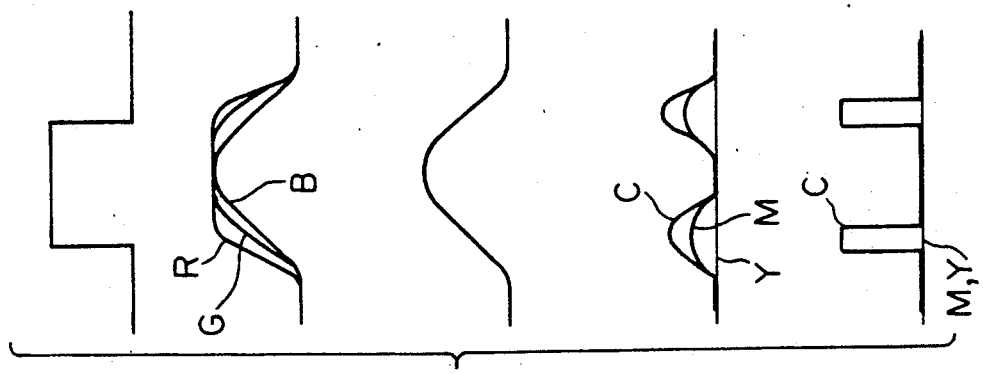
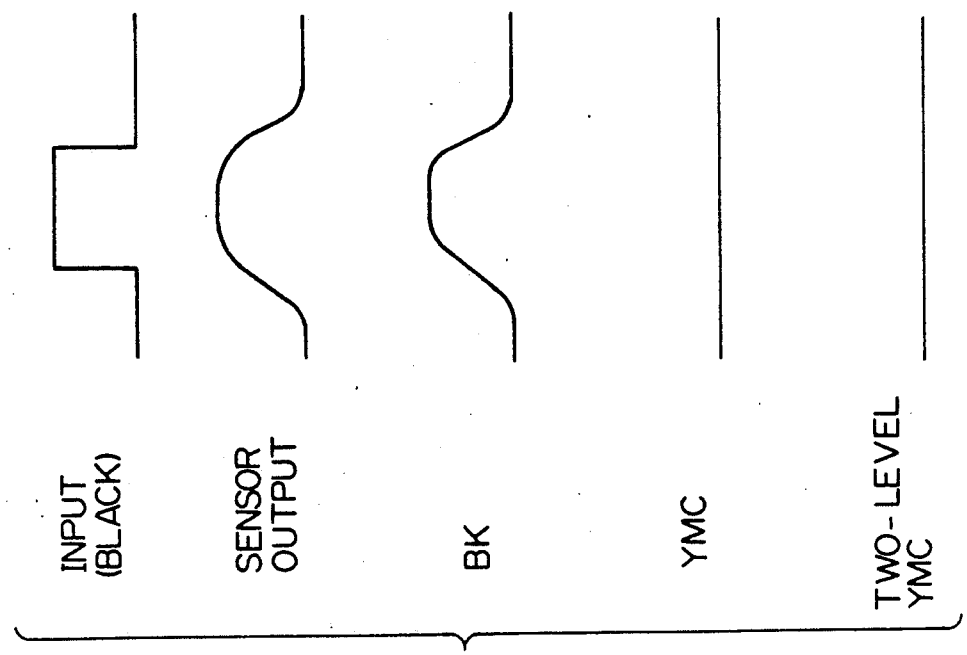

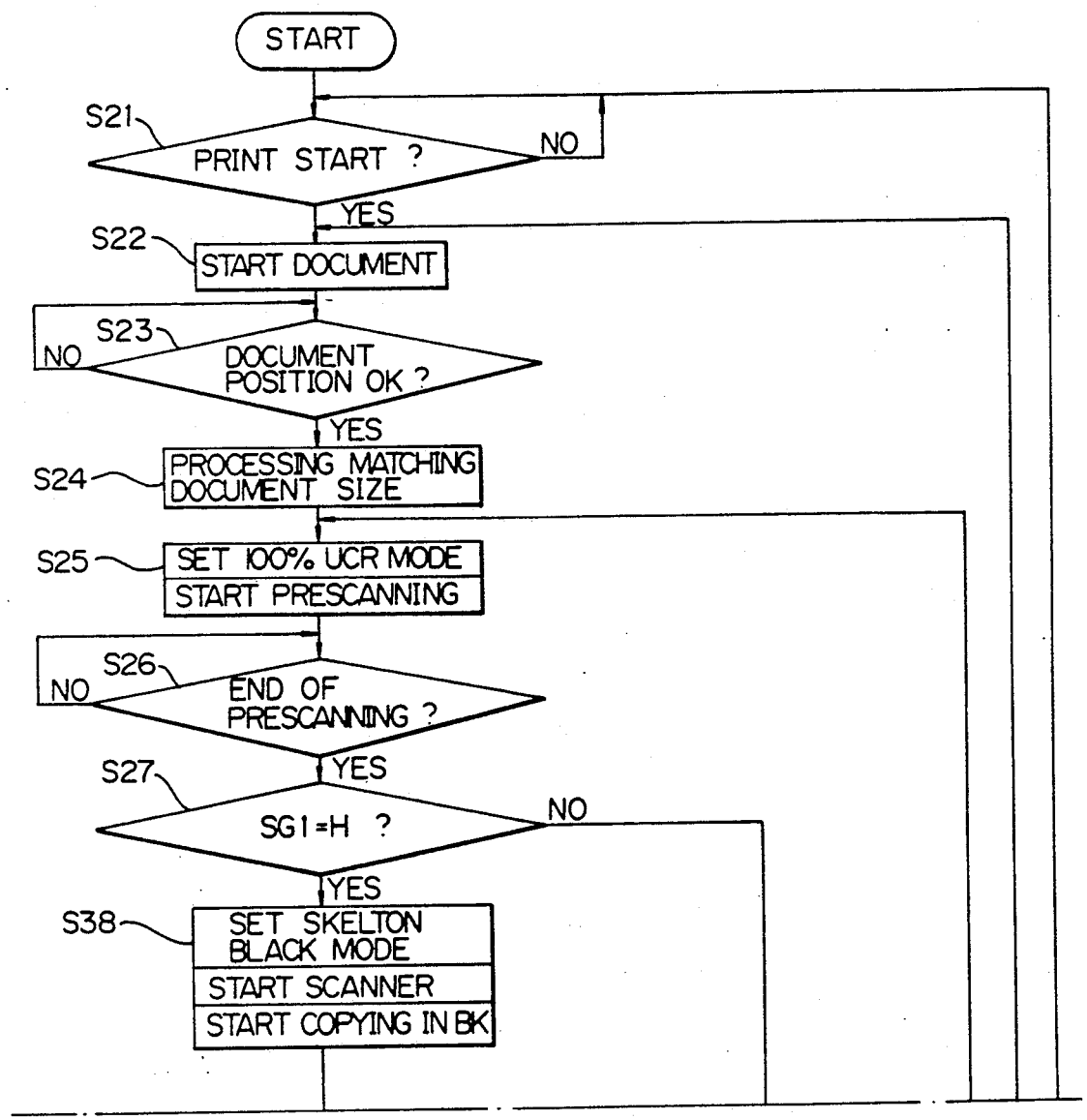

COLOR IMAGE PROCESSING APPARATUS

BACKGROUND OF THE INVENTION

The present invention relates to a color image processing apparatus and, more particularly, to a color image processing apparatus for automatically feeding one at a time a stack of a plurality of documents to process images printed thereon.

Color copiers available today include one of the type having a single image reproducing unit and reproducing a full-color image by repeating an iterative copying process a plurality of times. Specifically, this type of copier sequentially executes a copying process in each of four fundamental colors, i.e., cyan (C), magenta (M), yellow (Y), and black (BK) (or only C, M and Y), the resultant color components being transferred one above another to a single recording sheet. In a monochromatic mode, the copier reproduces a single image by a single copying process. The operator, therefore, has to attend to the switchover of the color mode because the required copying time greatly differs from the full-color mode to the monocolor mode, i.e., the operator has to switch over the color mode depending on the kind of a copy.

To free the operator from such troublesome mode switching operations, the operation mode of a copier may be switched over automatically by automatically determining whether a document image is color or black-and-white, as disclosed in Japanese Patent Laid-Open Publication (Kokai) No. 63-107274. The apparatus taught by this Laid-Open Publication compares the densities of Y, M and C of an image signal from which an achromatic component (black) has been removed (output of an undercolor removing circuit) with a predetermined threshold value, and determines that the image is achromatic or black-and-white if all the densities of Y, M and C are extremely low. Alternatively, the discrimination of an image as to color/black-and-white may be effected by extracting, among color components C, M and Y of an image signal, the maximum and minimum values and producing a difference therebetween, as shown and described in Japanese Patent Laid-Open Publication (Kokai) No. 62-101179.

A problem with the prior art apparatuses discussed above is that the accuracy of discrimination of an image as to color/black-and-white (achromatic color) is too low to eliminate discrimination errors. Should the threshold value with which image data should be compared be increased to reduce discrimination errors, all the thin image components would be determined to be achromatic.

The present invention contemplates to automatically discriminate an image as to color/achromatic with high accuracy and thereby executes optimal image processing matching the kind of an image without resorting to operator's manipulations. To this end, the present invention provides a color image processing apparatus comprising image reading means having spectral filter means for reading a visible image printed on a document sheet in a predetermined image reading area by scanning the image, color discriminating means for automatically determining whether or not the image is substantially monochromatic by processing image data produced by the image reading means and separated into a plurality of fundamental colors, edge detecting means for detecting edges of the image by processing the image data, discrimination inhibiting means for inhibiting the color discriminating means from operating when the edge detecting means has detected an edge of the image, and control means for automatically selecting and executing either one of color processing and monochrome processing in response to a result of discrimination by the color discriminating means.

The present invention determines whether or not a document image is monochromatic (especially achromatic) by processing image data derived from the document. In this type of apparatus, image reading unavoidably suffers from the deterioration of MTF (Modulation Transfer Function) due to the influence of a lens included in optics, for example. Specifically, edge portions of a document image where the tone and/or color sharply changes are blurred in a reproduction because the tone and/or color of the edge portions changes slowly in image data. Further, this kind of degradation of image quality appears with a different characteristic in each of the color-separated image components (red (R), green (G) and blue (B)). Moreover, sensors each being assigned to respective one of color-separated image light (R, G and B) are not free from positional deviations, so that the color components R, G and B in image data involve phase deviations corresponding to the positional deviations of the sensors.

The difference in MTF characteristic and the phase deviation of the color components stated above directly translate into color deviations in image data. For example, despite that only black (achromatic color) produced by combining R, G and B exists on a document image, image data representative of the document image is partly short of the color component R, G or B due to the deviation of R, G or B with respect to position (or time). Then, such a part will turn out to be chromatic. Thus, discriminating an image as to chromatic/achromatic by processing image data would render colors different from the colors of a document image. Nevertheless, it is only in the edge portions of an image where the tone and/or color sharply changes that erroneous discrimination is apt to occur. In accordance with the present invention, while image data representative of a document image is processed, the color discrimination is inhibited when an edge of the document image is detected. This is successful in minimizing erroneous discrimination and thereby allowing an image to be discriminated as to color/monochrome with high accuracy.

By using a signal produced by removing an achromatic (BK: black) component from image components Y, M and C, it is possible to promote easy discrimination of an image as to color/monochrome. Usually, this kind of signal is generated by an undercolor removing (UCR) circuit incorporated in an image processing unit. Therefore, the circuit arrangement will be simplified if the existing circuit is also usable for color/monochrome discrimination.

To simplify the circuit arrangement for the discrimination, the present invention provides a color image processing apparatus comprising image reading means having spectral filter means for reading a visible image printed on a document sheet in a predetermined image reading area by scanning the image, image processing means interconnected to an output of the image reading means, color image recording means interconnected to an output of the image processing means and comprising a plurality of chromatic recording systems which are different in hue from each other and an achromatic recording system, undercolor removing means included in the image processing means for processing input image data to detect an achromatic color component contained in the image, extracting as achromatic color data a value of a predetermined ratio associated with the detected achromatic color component, and subtracting a value corresponding to the extracted achromatic color data from the input image data to output chromatic color data, color discriminating means for determining whether or not the image is substantially monochromatic by processing the chromatic color data outputted by said undercolor removing means, edge detecting means for detecting edges of the image by processing the image data, discrimination inhibiting means for inhibiting the color discriminating means from operating when the edge detecting means has detected an edge of the image, and control means for causing the image reading means to read a single document image a plurality of times, the control means fixing, during a first image reading operation, the ratio of the undercolor removing means substantially to 100% and inhibiting the color image recording means from operating, the control means automatically and selectively conditioning the color image recording means to either one of a color processing mode and a monochromatic processing mode in response to a result of discrimination which the color discriminating means produces with image data resulted from the first image reading operation.

In the above construction, each document image is simply read and not recorded at first (prescanning) and, at this instant, the color discriminating means determines whether or not the image is monochromatic. During the second and successive image readings, recording is executed in color or monochrome. Since the removing ratio of the undercolor removing means is set to 100% during the prescanning, chromatic data outputted by the undercolor removing means substantially does not include an achromatic component. When such data is compared with a particular threshold value, whether or not the image is monochromatic will be readily determined.

In the event of actual image recording, 100% UCR processing would introduce a black component over the entire recorded image and thereby make it difficult to match C, M and Y ink and black ink. Nevertheless, the above construction of the present invention needs 100% UCR processing only during prescanning and sets an adequate ratio in the undercolor removing circuit during the second and successive image processing, promoting easy matching of C, M and Y ink and black ink in a recorded image with respect to tone. Hence, the undercolor removing circuit can be shared by the color/monochrome discrimination and the generation of a black component for image recording, whereby the circuit arrangement is simplified.

When prescanning is effected as stated above, even monochromatic image recording needs two times of scanning and, therefore, a substantial processing time. With a popular inexpensive image processing apparatus which lacks a frame memory, it is difficult to eliminate prescanning because such an apparatus is substantially not capable of executing image reading and recording at the same time.

To eliminate prescanning and thereby reduce required processing time, the present invention provides a color image processing apparatus comprising image reading means having spectral filter means for reading a visible image printed on a document sheet in a predetermined image reading area by scanning the image, image processing means interconnected to an output of the image reading means, color image recording means interconnected to an output of the image processing means and comprising a plurality of chromatic recording systems which are different in hue from each other and an achromatic recording system, background removing means included in the image processing means for correcting tone of input image data and removing a set background level from the image data, undercolor removing means included in the image processing means for processing image data outputted by the background removing means to detect an achromatic color component contained in the image, extracting as achromatic color data a value of a predetermined ratio associated with the detected achromatic color component, and subtracting a value corresponding to the extracted achromatic color data from the input image data to output chromatic color data, color discriminating means for determining whether or not the image is substantially monochromatic by processing the chromatic color data outputted by the undercolor removing means, edge detecting means for detecting edges of the image by processing the image data, discrimination inhibiting means for inhibiting the color discriminating means from operating when the edge detecting means has detected an edge of the image, and control means for setting, when the image reading means reads a single document image for the first time, a first background level in the background removing means, fixing the ratio of the undercolor removing means at substantially 100%, and in this condition causing the color image recording means to record an achromatic color component of the image, the control means setting, if a result of discrimination by the color discriminating means resulted from the first image reading operation is not monochromatic, a second background level in the background removing means, setting the ratio of the undercolor removing means such that the ratio is zero if tone is lower than a tone substantially the same as the first background level and has a predetermined value if otherwise, and in this condition executing a second and successive reading operations while conditioning the color image recording means for a recording mode for recording chromatic color components.

The above construction has the following device in order to eliminate prescanning. To begin with, during the first scanning, an achromatic component (black) is recorded at the same time as image reading. The undercolor removal (UCR) ratio is set to 100%. The background removing means removes an image component whose density is lower than the first background level in order to prevent an image area lower in density than the first background level from being recorded. Usually, when the 100% UCR ratio is selected, black ink will be recorded over the entire image area and make it difficult to match C, M and Y ink and black ink. Nevertheless, the above construction applies undercolor removal to data from which the background component of an image has been removed, so that black ink is recorded only in the portions where the density is higher than the background level, as in recording in black implemented by a skeleton black recording method known in the art. This allows black ink and C, M and Y ink to be readily matched to each other. Further, the resultant chromatic data has undergone 100% UCR processing and facilitates the discrimination by the color discriminating means.

When the image is determined to be monochromatic by the first scanning, the recording operation can be ended immediately because the recording in black has already been completed. In this case, density components lower than the first background level will not appear in a recorded image. This is rather favorable considering the fact that a monochromatic image often contains only characters and, therefore, has noticeable changes in density, i.e., removing the background erases noise image and leaves only necessary data. When the image is not monochromatic as determined by the first scanning, the second and successive scanning are executed while image data are recorded in chromatic ink of different colors (C, M and Y). For the second and successive scanning, the background level is changed to zero to stop the removal of background, while the undercolor removing means removes the undercolor at a predetermined ratio. Concerning this ratio, zero is selected for densities lower than the first background level while an adequate ratio other than zero is selected for higher densities. More specifically, the background removing level for the first scanning (first background level) and the boundary level for the switchover of the undercolor removal for the second and successive scannings are selected to be the same as each other. Hence, an image component lower in density than the first background level and, therefore, not recorded in black ink during the first scanning is recorded to 100% in chromatic ink during any of the second and successive scanning.

With the apparatus disclosed in the previously stated Laid-Open Patent Publication No. 63-107274, the operator has to position the individual documents in a document reading area every time copying processing is to be executed. An automatic document feeder (ADF) is available for automatically and continuously processing images which are printed on a number of document sheets. An ADF feeds one at a time a stack of document sheets loaded on a tray so as to locate them in an image reading area, the uppermost document sheet being first. This frees the operator from the manual replacement of documents and implements continuous automatic copying. In this kind of conventional ADF, a document feed control signal is generated in order to replace a document every time the document reading operation is repeated n consecutive times which corresponds to the desired number of copies of that document.

However, when the stack of documents on the tray include both of monochromatic (e.g. black-and-white) documents and color documents, they cannot be reproduced by fully automatic processing despite the use of an ADF. Specifically, unless the operator sets up either one of the color and monochromatic modes every time the kind of a document image (black-and-white or color) changes, all the documents will be dealt with in the color mode or the monochromatic mode. While the operator may separate a desired stack of documents into color documents and monochromatic documents beforehand in order to minimize the number of times of the switchover, such an operation is time- and labor-consuming.

The present invention allows, even when a document stack has both of color and monochromatic document, the documents to be processed continuously without resorting to the operator's manipulations while minimizing the processing time. For this purpose, a color image processing apparatus of the present invention comprises image reading means having spectral filter means for reading a visible image printed on a document in a predetermined image reading area by scanning the image, color discriminating means for automatically determining whether or not the image is substantially monochromatic by processing image data outputted by the image reading means and separated into a plurality of fundamental colors, edge detecting means for detecting edges of the image by processing the image data, discrimination inhibiting means for inhibiting the color discriminating means from operating when the edge detecting means has detected an edge of the image, automatic document feeding means loaded with a plurality of document sheets each carrying a visible image thereon for feeding the document sheets one by one to the predetermined image reading area of the image reading means, and control means for switching over, on the basis of a result of discrimination by the color discriminating means, correspondence between the number of times that the image reading means scans a document sheet and the number of times that the automatic document feeding means feeds a document sheet.

In the above construction, the color discriminating means detects the color of an image printed on a document and lying in the image reading area and, at the same time, automatically determines whether or not the color is substantially monochromatic. Based on the result of discrimination, the control means switches over the correspondence between the number of times that the image reading means scans a document and the number of times that the automatic document feeding means feeds a document. For example, in a color copier selectively operable in a full color mode which produces a single copy by repeating a copying process four consecutive times and a black-and-white mode which produces a single copy by a single copying process, every time a new document is fed, whether or not an image printed thereon is color or black-and-white is discriminated automatically. If the image is a color image, it is scanned 4×n (desired number of copies) times, and then the next document is fed. If the image is a black-and-white image, it is scanned n times, and then the next document is fed. Hence, even when color documents and black-and-white documents are stacked together, the apparatus automatically discriminates them as to color and feeds them at adequate timings. This allows the documents to be continuously processed within a minimum necessary period of time while freeing the operator from troublesome manipulations. When an image is printed on a document in ink of single hue such as C, M or Y, it can be processed by single scanning and, therefore, handled in the same manner as a black-and-white image.

SUMMARY OF THE INVENTION

It is an object of the present invention to automatically discriminate a color image and an achromatic image with accuracy so that optimal image processing matching the kind of an image may be executed without resorting to operator's manipulations.

It is another object of the present invention to simplify the circuit construction for color/monochrome discrimination.

It is another object of the present invention to reduce the required processing time by eliminating prescanning.

It is another object of the present invention to process color documents and monochromatic documents stacked together continuously without resorting to operator's manipulations, while minimizing the required processing time.

BRIEF DESCRIPTION OF THE DRAWINGS

The above and other objects, features and advantages of the present invention will become more apparent from the following detailed description taken with the accompanying drawings in which:

FIGS. 8A to 8C are timing charts each showing the variation of an input image and the state of an output image signal under a particular condition;

DESCRIPTION OF THE PREFERRED EMBODIMENTS

Figure 1:
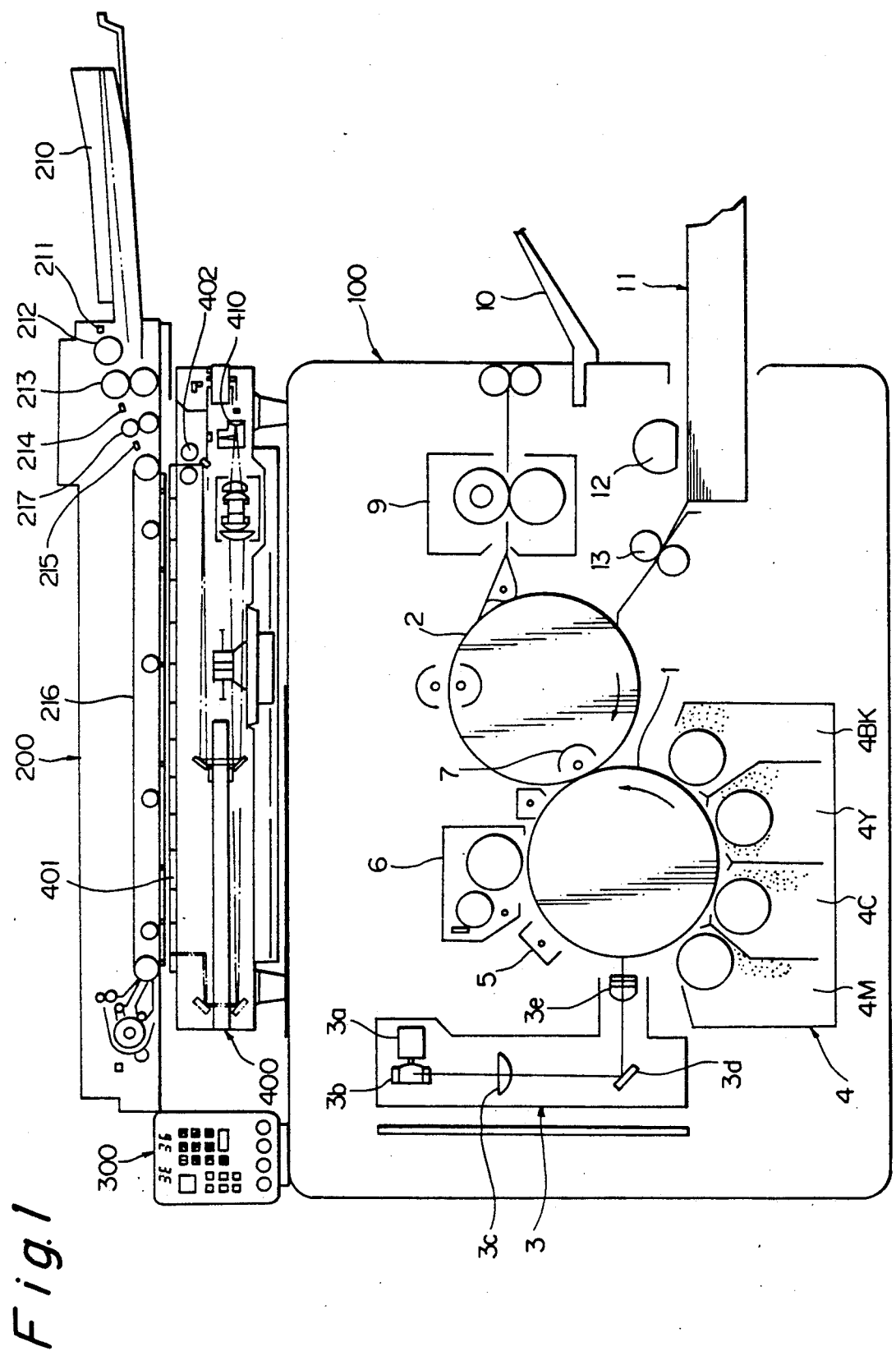
FIG. 1 is a front view of a digital color copier to which the present invention is applicable.

Referring to FIG. 1 of the drawings, a digital color copier to which the present invention is applicable is shown and generally made up of a laser printer 100, an ADF 200, an operation board 300, and an image scanner 400.

The image scanner 400 has an image reading section located below a glass platen 401. The image reading section is mechanically driven in the left-and-right direction as viewed in the figure, i.e., in the subscanning direction. Light issuing from a lamp 402 is incident to a document which is laid on the glass platen 401, so that the resultant reflection from the document is representative of a density distribution of the latter. The reflection, or image light, is incident to a dichroic prism 410 by way of a number of mirrors and a lens. The dichroic prism 410 separates the incident light on the basis of wavelength into three different colors, i.e., red (R), green (G), and blue (B). The three color components each is incident to respective one of three one-dimensional image CCD (Charge Coupled Device) image sensors which are incorporated in the image scanner 400. The image scanner 400, therefore, senses the color components R, G and B existing on one main scanning line of the document image at the same time. Eventually, a two-dimensional image of the document is read with the image reading section being driven in the subscanning direction as mentioned previously.

The ADF 200 is located above the scanner 400. A document table 210 may be loaded with a stack of any desired number of documents. In the event of document feed, a pick-up roller 212 is brought into contact with the top of the document stack and driven in a rotary motion. A separation roller 213 serves to prevent two or more documents from being fed together. The document paid out to a predetermined position is further transported by a pull-out roller 217 and a belt 216 along the glass platen 401 to a predetermined reading position. As soon as the document reaches the reading position, i.e., when its leading edge reaches the leftmost position of the glass platen 401, it is brought to a stop. After the document has been read, it is again transported by the belt 216 and thereby driven out of the glass platen 401. At the same time, the next document is driven by the belt 216 to the reading position. An optical sensor 211 is located just ahead of the pick-up roller 212 in order to determine whether or not documents exist on the document table 210. Another optical sensor 214 is interposed between the separation roller 213 and the pull-out roller 217 for sensing the leading edge and the size of a document. Specifically, the sensor 214 is constituted by a plurality of sensors which are located at spaced positions in the main scanning direction, so that the size or width of a document as measured in the main scanning direction may be determined on the basis of the combination of their outputs. A pulse generator is associated with a drive motor, not shown, to generate pulses the number of which is associated with the amount of rotation of the motor. A controller installed in the ADF 200 determines the size or length of a document as measured in the subscanning direction by counting the output pulses of the pulse generator which successively appear until the document moves away from the sensor 214. The pick-up roller 212 and separation roller 213 are driven by a document feed motor, while the pull-out roller 217 and belt 216 are driven by a transport motor. A register sensor 215 is located downstream of the pull-out roller 217 with respect to the direction of document feed.

The laser printer 100 has a photoconductive drum 1 for reproducing an image. Arranged around the drum 1 are a charger 5, writing unit 3, a developing unit 4, a transfer drum 2, a cleaning unit 6, etc. The charger 5 uniformly charges the surface of the drum 1 to a high potential by a corona current. As a laser beam issuing from the writing unit 3 illuminates the charged surface of the drum 1, the charge potential is varied depending on the intensity of the light. As a result, a particular potential distribution is developed on the drum 1 in association with the light intensity. Specifically, the writing unit 3 has a laser diode, not shown. A laser beam from the laser diode is steered by a polygonal mirror 3b, a lens 3c, a mirror 3d and a mirror 3e to reach the surface of the drum 1. The polygonal mirror 3b is driven in a high-speed rotary motion by a motor 3a. A controller applies to the laser diode a pixel-by-pixel two-level signal (record/non-record) associated with a desired image, such that the individual pixel positions are synchronous to the angular positions of the polygonal mirror 3b. More specifically, the laser beam is controlled on and off at each scanning position of an image in response to the density (record/non-record) of a pixel located there.

Therefore, the potential distribution developed on the drum 1 forms an electrostatic latent image which corresponds to the document image with respect to the density. The developing unit 4 is located downstream of the writing unit 3 with respect to the direction of rotation of the drum 1 and develops the latent image by a toner. In the illustrative embodiment, the developing unit 4 has four developing subunits 4M, 4C, 4Y and 4BK which are loaded with a magenta (M) toner, a cyan (C) toner, a yellow (Y) toner, and a black (BK) toner, respectively. In this specific printer configuration, the four developing subunits are energized one at a time and, hence, the latent image is developed by one of the toners of different colors M, C, Y and BK.

A cassette 11 is loaded with a stack of paper sheets. A paper sheet paid out from the cassette 11 by a feed roller 12 is transported toward the transfer drum 2 by way of a register roller 13. The paper sheet is moved by the transfer drum 2 while lying thereon. A transfer charger 7 is energized to transfer the toner image from the drum 1 to the paper sheet being moved in close proximity of the surface of the drum 1. In a monocolor copy mode, the paper sheet carrying the toner image thereon is separated from the transfer drum 2, fixed by a fixing unit 9, and then driven out to a tray 10. In a full-color mode, it is necessary to superpose the four different colors BK, M, C and Y on a single paper sheet. This is implemented by forming a toner image BK on the drum 1, transferring the toner image BK to a paper sheet, forming a toner image M on the drum 1 without the paper sheet being separated from the transfer drum 2, and then transferring the toner image M to the paper sheet. The other toner images C and Y are sequentially transferred to the same paper sheet in the same manner. A single color image is, therefore, reproduced on a paper sheet by the toner image forming and transferring process which is repeated four times in total. After all the toner images have been transferred to the paper sheet, the paper sheet is separated from the transfer drum 2, transported to the fixing unit 9 for fixing the toner image, and then discharged to the tray 10.

Figure 2:
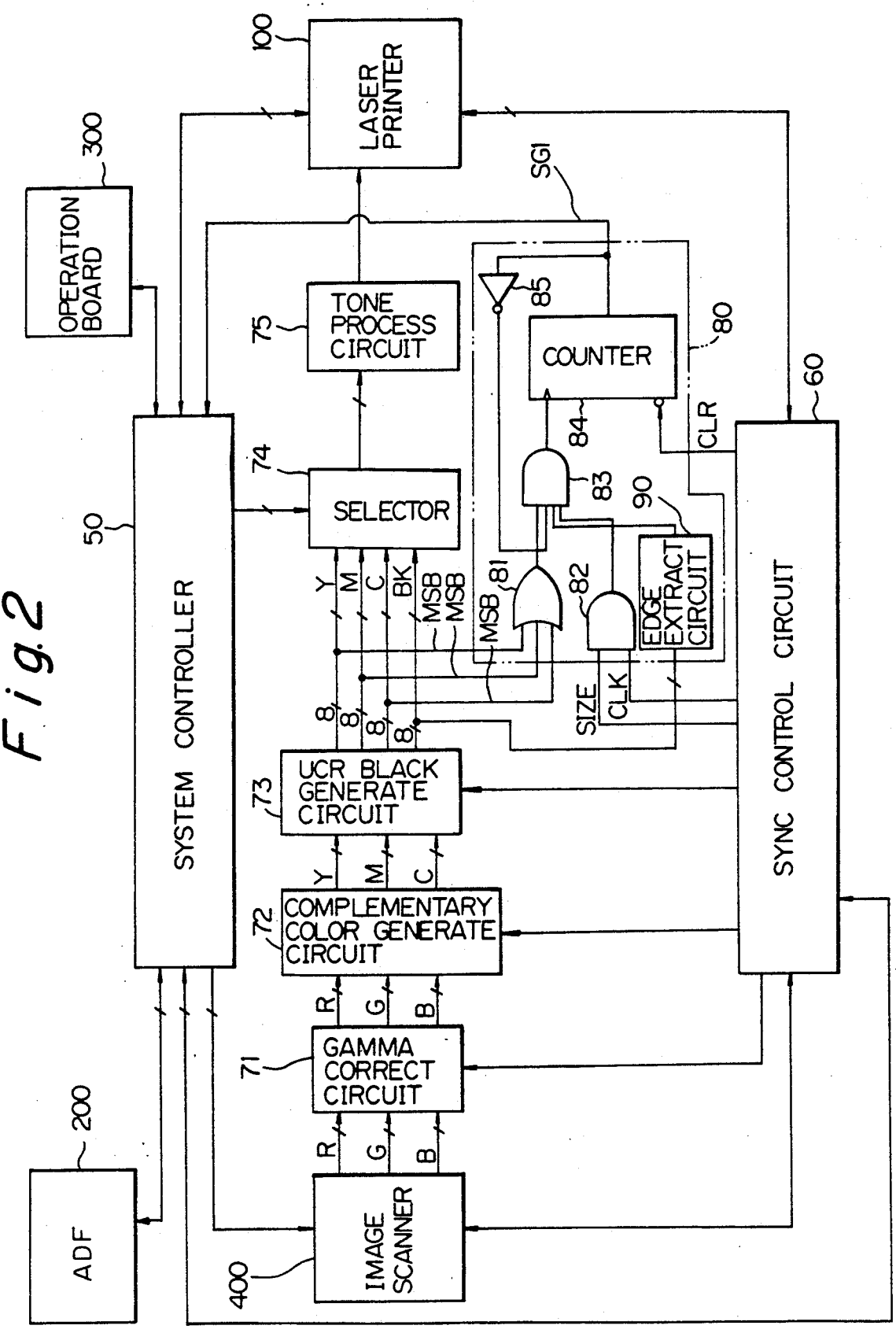
FIG. 2 is a schematic block diagram showing an electrical arrangement associated with the copier of FIG. 1.

Referring to FIG. 2, an electrical arrangement incorporated in the color copier of FIG. 1 is shown. As shown, the arrangement includes a system controller 50 which supervises the operations of the entire copier and is implemented as a microcomputer, for example. A synchronization control circuit 60 generates a clock pulse which is the reference for control timings. Further, the control circuit 60 receives and delivers various signals in order to synchronize signals which are interchanged among various control units. In this specific circuit arrangement, a main scan sync signal which is the source of scanning timings appears in synchronism with the scanning position of the polygonal mirror 3b of the laser printer 100. The image scanner 400 transforms the read image signals R, G and B into digital signals and delivers them as color image data having eight bits each. The image data are individually subjected to various kinds of processing at a image processing unit, which will be described, and then applied to the laser printer 100.

The image processing unit has a gamma correcting circuit 71, a complementary color generating circuit 72, an UCR black generating circuit 73, a selector 74, and a tone processing circuit 75. The complementary color generating circuit 72 transforms the color data R, G and B into complementary color data Y, M and C, respectively. The UCR black generating circuit 73 separates a black component included in a color which is the mixture of the input colors Y, M and C, and outputs it as color data BK. At the same time, this circuit 73 removes the black components of the other signals. Details of the UCR black generating circuit 73 will be described in more detail later. The selector 74 selects one of the outputs Y, M, C and BK of the UCR black generating circuit 73 at a time in response to an instruction from the system controller 50. The selected signal Y, M, C or BK is fed to the tone processing circuit 75. While the circuit 75 binarizes the input 8-bit density data, it executes dither processing in order to implement the output of halftone. The resultant two-level image data is fed to the laser printer 100.

The outputs of the UCR black generating circuit 73 are connected to a color discriminating circuit 80 which determines whether or not a document image contains any chromatic color. The UCR black generating circuit 73 separates black, i.e., an achromatic component BK from the input image data, as stated earlier. Hence, the output data Y, M and C of the circuit 73 are chromatic components. It follows that whether or not a document image contains a chromatic color or colors can be determined on the basis of the outputs Y, M and C of the circuit 73. However, colors detected by an image reading system are somewhat different from actual colors and, moreover, a document image may have been smeared in chromatic colors. In the light of this, the illustrative embodiment ignores chromatic components of relatively low density and, only when a chromatic color extends over a predetermined pixel area, produces a chromatic color signal (SG1: "H").

Only the most significant bit (MSB) of each of the data Y, M and C is fed from the UCR black generating circuit 73 to the color discriminating circuit 80. Specifically, only when any one of the chromatic color signals Y, M and C has a density equal to or higher than 128, or 50%, the circuit 80 determines it valid. When such a valid signal appears, a counter 84 starts counting pixels over which the color of interest extends. The counter 84 is operated document by document, i.e., it is cleared by a clear signal CLR at the beginning of document reading and thereby allowed to count. A signal SIZE is determined on the basis of the detected size of a document; it remains in a high level or "H" while the range where a document actually exists is scanned and goes low or "L" while the other range is scanned. A signal CLK is a clock appearing in synchronism with the individual pixels.

At first, the counter 84 is cleared by the clear signal CLR to in turn maintain the output of an inverter 85 in "H". While an area where a document exists is read, clock pulses appear on the output of an AND gate 82 pixel by pixel. When a chromatic color signal whose density is higher than 50% appears, the output of an OR gate 81 turns to "H" with the result that the clock pulses are fed to the count input terminal of the counter 84. More specifically, the counter 84 continuously counts the clock pulses, or pixels, so long as such a chromatic color signal is present. The counter 84 is a binary counter. The output terminal of the color discriminating circuit 80 is interconnected to a bit 8 of the binary counter 84. In this configuration, when the counter 84 reaches "512", a discrimination signal SG1 turns from "L" to "H". Then, the output of the inverter 85 goes low to prevent the clock pulses from being fed to the counter 84 any further, so that the discrimination signal SG1 remains in the same status until the next clear signal CLR arrives.

In the illustrative embodiment, the color discriminating circuit 80 includes an edge extracting section 90 for determining whether or not an edge of an image as represented by a great change in tone has appeared. The edge extracting section 90 is interconnected to the AND gate 83. When this section 90 extracts an edge, the clock pulses are inhibited from reaching the counter 84 even if a chromatic color signal whose density is higher than 50% is present. In this embodiment, therefore, edges of an image do not effect the chromatic/achromatic color discrimination at all. Why this kind of circuit configuration is adopted is as follows.

Granting that an image reading device has ideal characteristics, MTF (Modulation Transfer Function) is unavoidably lowered from an original image to an image signal representative of the original image. Specifically, as shown in FIG. 8A, even when the tone of an input image varies stepwise, the output of a sensor builds up and falls slowly resulting in a blurred reproduction. In the condition shown in FIG. 8A, chromatic color components Y, M and C do not appear at all. In practice, however, such ideal characteristics are not achievable. Specifically, as shown in FIG. 8B, despite that an achromatic color is obtained by combining R, G and B of substantially the same tone, R, G and B in the sensor output differ from one another with respect to the gradient of buildup and fall because the degree of deterioration of MTF depends on the wavelength. This causes chromatic (Y, M and C) components to appear in the output at the edge portions of the image, despite that the input is an achromatic color. Further, when three different sensors are each assigned to respective one of color components R, G and B, they cannot be free from some deviation in position from one another. Then, as shown in FIG. 8C, the image will be deviated in phase in the sensor output and cause chromatic components (Y, M and C) to appear at the edge portions of the image, despite that the input is achromatic. In the conditions shown in FIGS. 8B and 8C, when a color is discriminated as to chromatic/achromatic on the basis of color separated image signals R, G and B, it is likely that chromatic colors are sensed at the edge portions of an image in spite of the achromatic input.

In the light of the above, in the illustrative embodiment, when the edge extracting circuit 90 has detected an edge of an image, the delivery of clock pulses to the counter 84 is interrupted to inhibit the decision as to chromatic/achromatic. This is successful in reducing discrimination errors to a noticeable degree.

Figure 5:
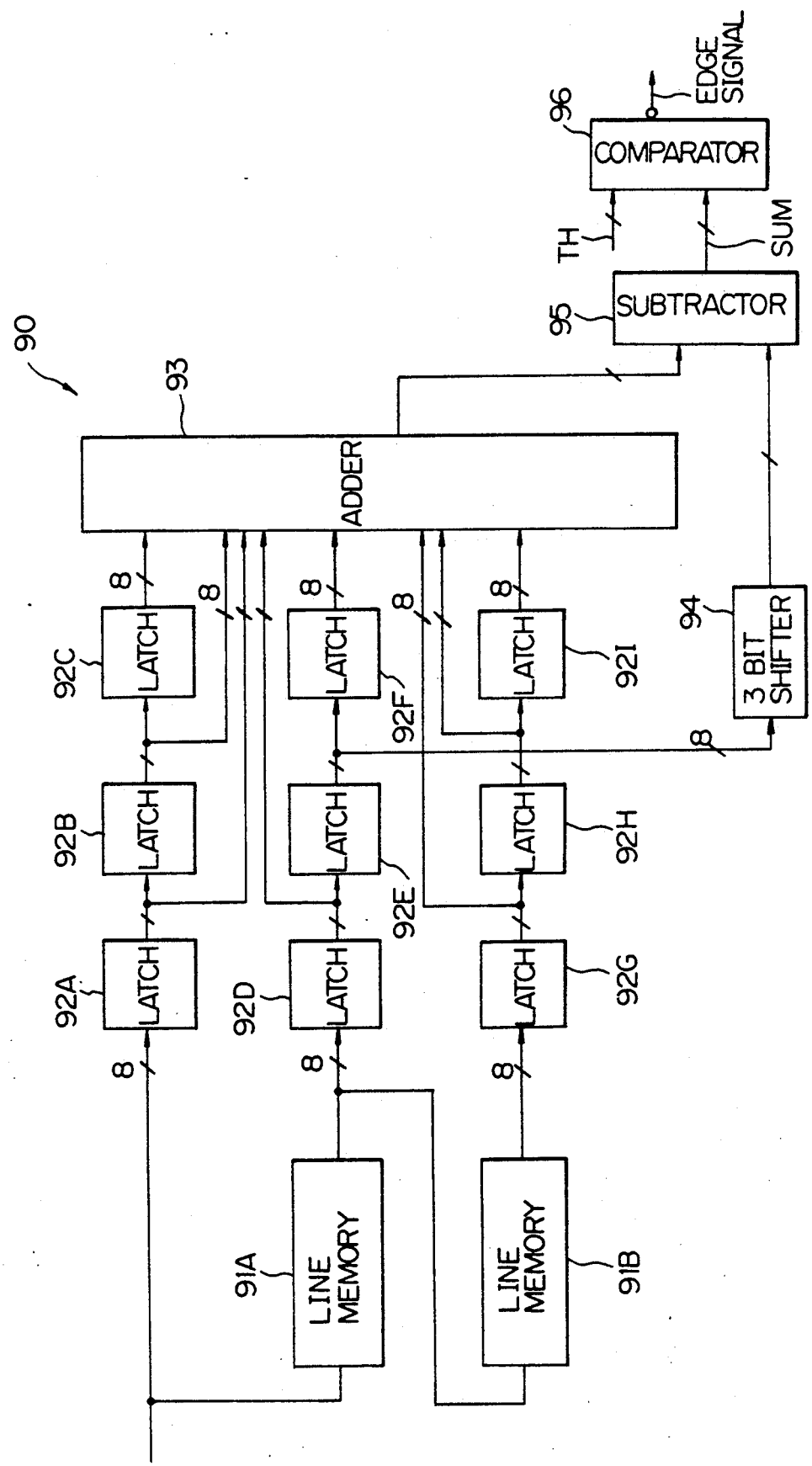
FIG. 5 is a block diagram schematically showing an edge extracting circuit of FIG. 2.
Figure 9:
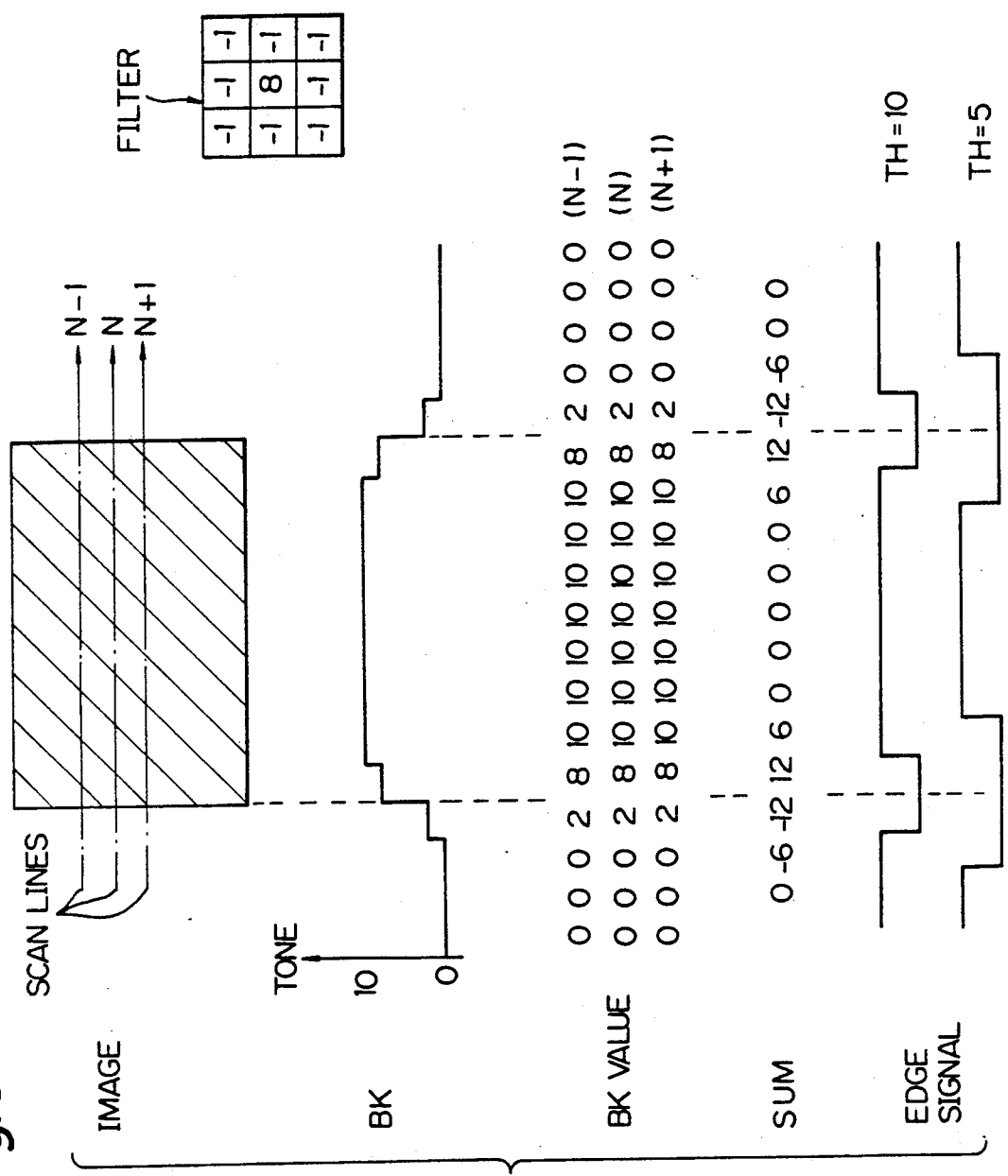
FIG. 9 is a timing chart showing a specific variation of a signal in the edge extractin circuit.

Referring to FIGS. 5 and 9, a specific construction of the edge extracting circuit 90 and its operation will be described. The edge extracting circuit 90 deals with a two-dimensional image area in the form of a 3×3 pixel matrix, as represented by a filter at the right-hand side of FIG. 9. By assigning specific coefficients to the individual pixels of the image area as shown in FIG. 9, the circuit is capable of separating only the edges of an image.

In FIG. 5, nine latches 92A to 92I output respectively the tone data of the nine pixel positions of the above-stated two-dimensional area at the same timing. Line memories 91A and 91B each produces image data having been delayed by one subscanning line with respect to time, whereby three lines of data are coincident in timing. Among the pixel data of the 3×3 area, the data of the center pixel is fed to one input terminal of a subtractor 95 via a 3 bit shifter 94. The 3 bit shifter 94 shifts the input data by three bits toward the uppermost position to thereby produce eightfold data. The word "eightfold" corresponds to the coefficient "8" assigned to the center pixel of the filter shown in FIG. 9. The data of the other eight pixels surrounding the center pixel are routed to an adder 93. The adder 93 sums the eight input data and delivers the result to the other input terminal of the subtractor 95. Consequently, the subtractor 95 produces an output SUM which is the output of the filter shown in FIG. 9. The output SUM of the subtractor 95 is fed to a digital comparator 96 to be compared with threshold data TH. The digital comparator 96 delivers an edge signal representative of the result of comparison.

FIG. 9 indicates a specific case wherein data existing on three successive scanning lines N−1, N and N+1 are filtered. As shown, although the signal BK rises and falls slowly, compared to the clear-cut edges of an input image, due to the deterioration of MTF, it is possible to detect such deformed portions (edge portions) by adequately selecting the threshold level TH.

Figure 6:
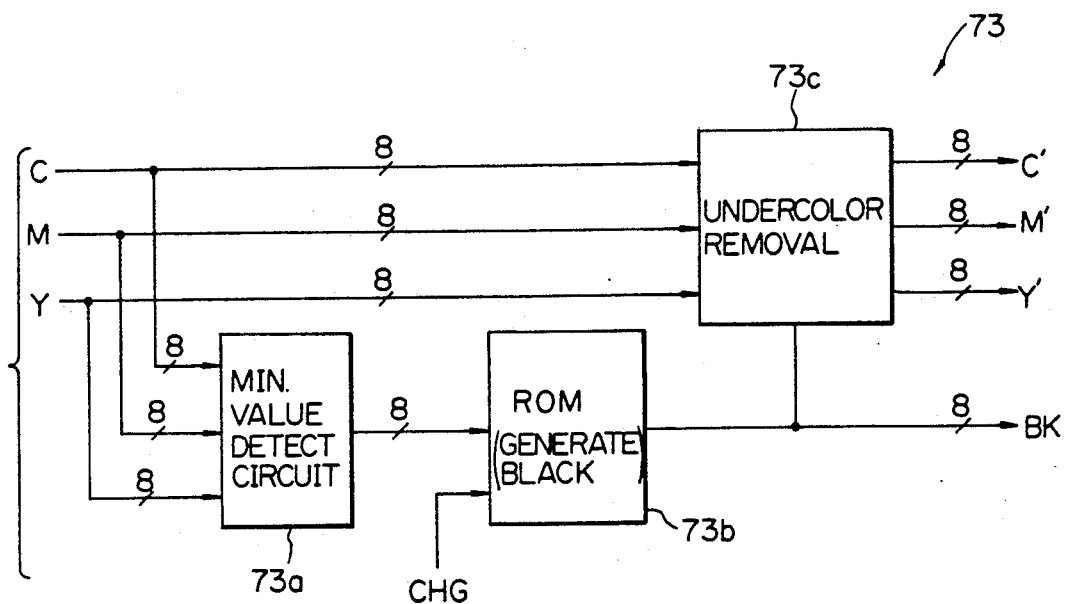
FIG. 6 is a schematic block diagram of an UCR black generating circuit shown in FIG. 2.
Figure 10A:
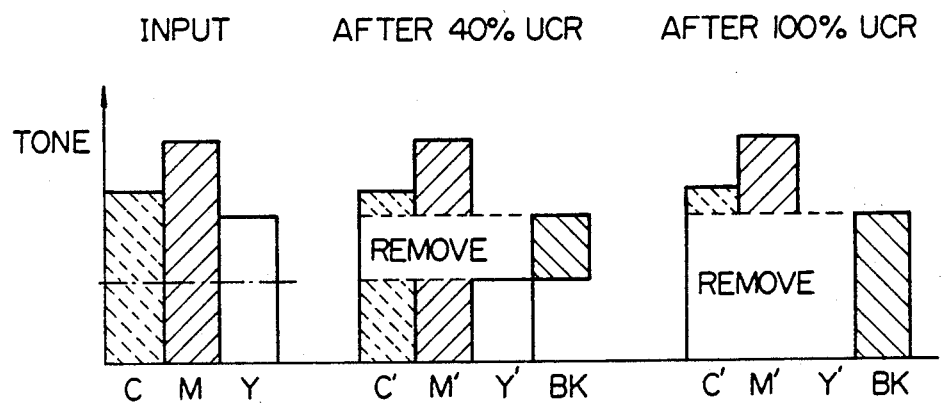
FIGS. 10A to 10C are graphs representative of the densities of individual color components included in an image signal.
Figure 10B:
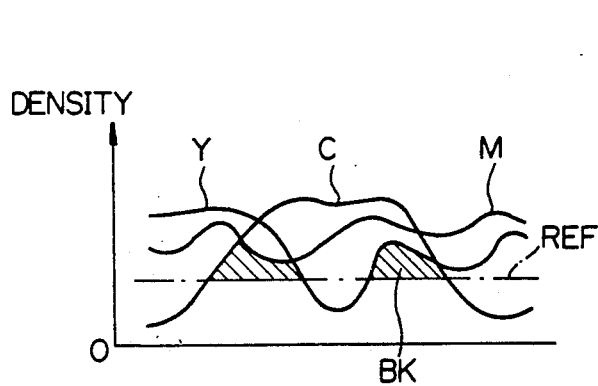
Figure 10C:
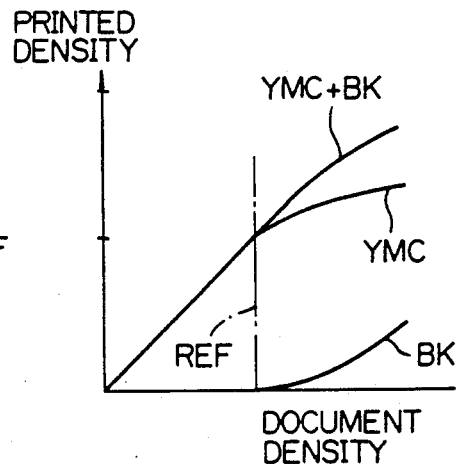

FIG. 6 shows a specific construction of the UCR black generating circuit 73, FIG. 2. As shown, the UCR black generating circuit 73 is made up of a minimum value detecting section 73a, a ROM 73b, and an undercolor removing section 73c. The minimum value detecting section 73a detects, among the image signals C, M and Y, a signal having the lowest tone level as an achromatic signal and delivers the detected achromatic color signal (C, M or Y). A black (BK) signal is generated on the basis of this achromatic color signal. The undercolor removing section 73c subtracts the black signal BK from the individual input image signals (C, M and Y) to produce signals C', M' and Y'. For example, assume that 100% of an achromatic signal is outputted as a black signal. Then, as shown at the right-hand side of FIG. 10, the minimum component Y' will be zero while the component BK will have the same level as the minimum component Y.

Generally, executing 100% UCR processing is undersirable because it would introduce a black component over the entire area of a recorded image and would thereby make it difficult to match C, M and Y ink to black ink with respect to tone. To cope with this problem, there has recently been adopted a recording method called a skeleton black method which changes the ratio of the component BK to the achromatic color component in matching relation to the tone (density).

The ROM 73b shown in FIG. 6 is so constructed as to accommodate both the skeleton black method and the 100% (fixed) UCR. Specifically, the ROM 73b is selectively operable in a skeleton black mode and a 100% UCR mode in response to a switching signal CHG which is coupled to one address input terminal thereof. The ROM 73b stores in its different addresses the values of the signal BK which are associated one-to-one with the tones of the detected signal having a minimum value (achromatic signal). When an achromatic color signal is fed to an address terminal of the ROM 73b, a value matching the achromatic color signal is read out of the ROM 73b and fed out as a signal BK. The ratio of the BK signal to the achromatic color signal with respect to tone is 100% (fixed) in the 100% UCR mode, while it is variable in the skeleton black mode in matching relation to the tone of the achromatic color signal. In the skeleton black mode, the UCR ratio is 0% when the tone is lower than a reference level REF shown in FIG. 10C. The illustrative embodiments incorporates the 100% UCR mode in order to eliminate discrimination errors as to achromatic/chromatic. Specifically, assuming that the UCR black generating circuit 73 is shared by the image processing and the achromatic/chromatic color discrimination, a part of chromatic color signals remains as an achromatic color signal when it comes to the skeleton black mode (see the center of FIG. 10A). Using such an achromatic signal is apt to bring about an error.

To determine whether or not a document image is achromatic, the entire document image has to be read once. Usually, this is implemented by an extra reading operation (prescanning) at the cost of time. The illustrative embodiment executes the processing for discriminating a document image as to chromatic/achromatic at the same time as the ordinary recording processing, thereby saving the extra time otherwise consumed by prescanning. Nevertheless, the 100% UCR mode is desirable in the event of the discrimination at to chromatic/achromatic, while the skeleton black mode is desirable in the event of image recording, as stated earlier. In this condition, executing the image discrimination and the image recording at the same time would force either one of them to be processed in an inadequate UCR mode. The illustrative embodiment settles such a dilemmatic situation, as follows.

Figure 7A:
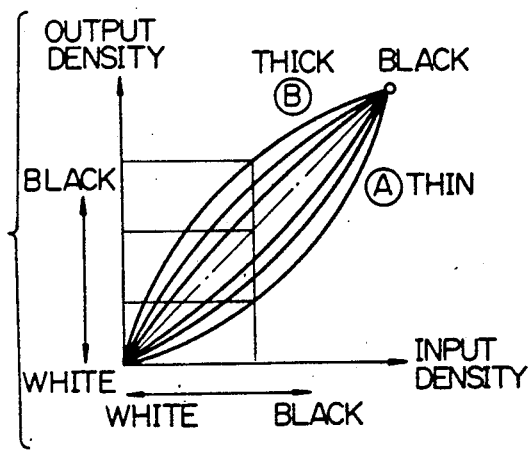
FIGS. 7A and 7B are graphs indicative of input-output characteristics of a gamma correcting circuit.
Figure 7B:
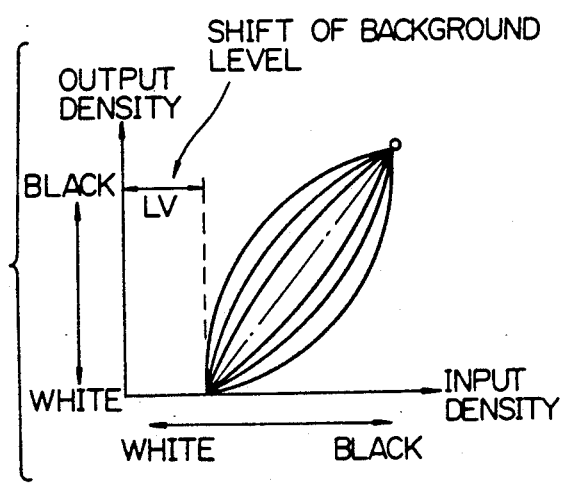

When an image is read (and recorded) for the first time, the gamma correcting circuit 71 shifts the background level, as shown in FIG. 7B, and the 100% UCR mode is selected. Under this condition, an image is discriminated and a black component is recorded, at the same time. The shift LV of the background level shown in FIG. 7B is selected to be the same as the reference level REF (see FIG. 10C) assigned to the skeleton black mode, with respect to tone. When the document image is chromatic, the shift of the background level is cancelled (see FIG. 7A) and the UCR mode is switched to the skeleton black mode, for the second and successive image reading operations. In this condition, the chromatic colors (C, M and Y) are recorded in sequence. During the first image reading which is implemented with the 100% UCR mode, there is little chance of error in the discrimination of the image as to chromatic/achromatic. Further, while the image is read for the first time, no signals appear and, therefore, black ink is not applied to image portions where the density is lower than the above-mentioned level LV. Stated another way, black ink is applied only in image portions where the density is high and which have to be recorded in black ink, as during the recording in black in the skeleton black mode. By the second and successive image reading operations, the portions lower in density than LV (REF) and having not been recorded in black ink are recorded in ink C, M and Y to 100%. At the same time, in portions where the density is high, the image is recorded in the ink C, M and Y only for the chromatic components from which the black component has been subtracted. Concerning an achromatic image, portions the density of which is lower than LV will not be recorded at all. This is not problematic considering the fact that an achromatic image often includes only characters, i.e., not recording portions of low density by regarding them as noise is sometimes more successful than recording them.

Figure 4A:
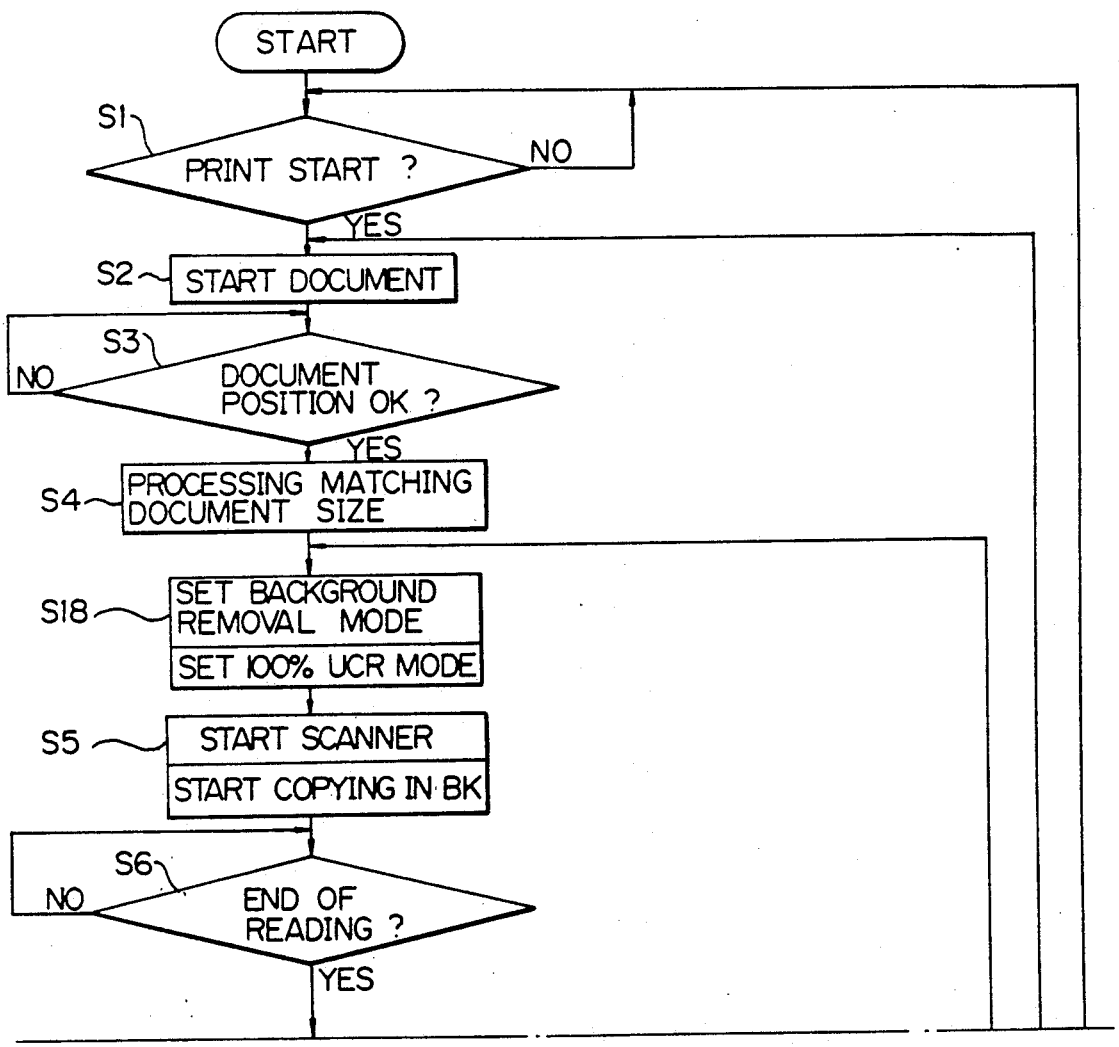
FIG. 4 is a flowchart outlining the operation of a system controller shown in FIG. 2.
Figure 4B:
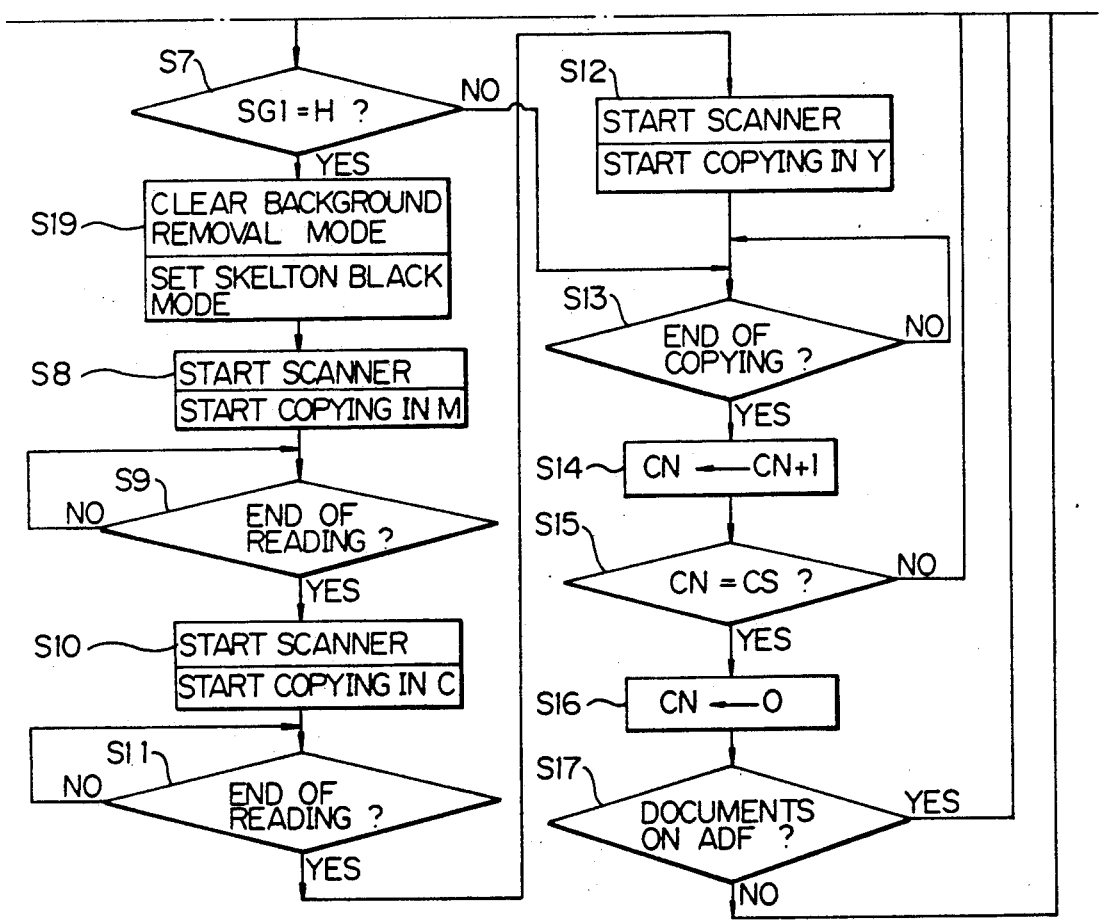

Referring to FIG. 4, the general operation of the system controller 50 will be described. In a step S1, the system controller 50 waits until a print start key has been turned on. On the turn-on of the print start key, the system controller 50 feeds a document start signal to the ADF 200 (step S2). In response, the ADF 200 pays out the first or uppermost document sheet toward the glass platen 401 of the image scanner. Then, the program awaits the time when the document will be accurately located at the glass platen 401 (step S3). After the ADF 200 has started paying out the document, it senses the leading edge of the document. When the leading edge of the document reachs the leftmost position of the glass platen 401, the ADF 200 stops driving the document and sends an end-of-positioning signal to the system controller 50. In response, the system controller advances to a step S4 for setting up various conditions which match the size of the document. As previously stated, the ADF 200 senses the size (width and length) of the document by the sensor 214 and delivers the sensed size to the system controller 50. Based on the size data, the system controller 50 sets up, for example, the timing of the signal SIZE which the synchronization control circuit 60 generates. In a step S18, the system controller 50 controls the gamma correcting circuit 71 to turn on the background removal mode (FIG. 7B) and controls the signal CHG of the UCR black generating circuit 73 to select the 100% UCR mode.

In a step S5, the system controller 50 delivers an instruction to the image scanner 400 for causing it start reading the document image, while feeding an instruction to the laser printer 100 to urge the latter to start printing in color BK. As a result, while the image scanner 400 sequentially reads the document image, the writing unit 3 of the laser printer 100 is energized by a color component BK included in the read image. At this instant, the developing subunit 4BK is selected to develop the resultant latent image, and the developed image is transferred to a paper sheet which will have been wrapped around the transfer drum. If the document image contains a chromatic color, the counter 84 of the color discriminating circuit 80 will reach "512" before the image scanner 400 reads the entire document image. Then, the discrimination signal SG1 goes high. As the entire image is read as decided in a step S6, the system controller 50 references the status of the discrimination signal SG1 (step S7). If the answer of the step S7 is YES, meaning that the document contains a chromatic color, the program advances to a step S19; if otherwise, meaning that the document is achromatic (black/white), the operation is transferred to a step S13. In the step S19, the system controller 50 controls the gamma correcting circuit 71 to cancel the background removal mode (FIG. 7A) an controls the signal CHG of the UCR black generating circuit 73 to set up the skeleton black mode.

In a step S8, the system controller 50 instructs the image scanner 400 to start scanning the document image while instructing the laser printer 100 to start printing in the color M. Consequently, the document image is sequentially read, and writing unit 3 of the laser printer 100 is energized by a color component M of the read image. At this time, the developing subunit 4M develops the resultant latent image. The developed image or toner image is transferred to the paper sheet having been wrapped around the transfer drum. When the document image is fully read as decided in a step S9, the system controller 50 again instructs the image scanner 400 to start scanning the document image and the laser printer 100 to start printing in the color C. As a result, the document image is sequentially read and, among the read image, a color component C energizes the writing unit 3 of the laser printer 100. The resultant latent image is developed by the developing subunit 4C, and the resultant toner image is transferred to the paper sheet retained on the transfer drum.

As the document image is fully read as decided in a step S11, the system controller 50 instructs the image scanner 400 to start scanning the document image and the laser printer 100 to start printing in the color Y (step S12). Then, the document image is sequentially read and a color component Y of the read image energizes the writing unit 3 of the laser printer 100. The resultant latent image is developed by the developing subunit 4Y, and the developed image or toner image is transferred to the paper sheet retained on the drum. If the document image is achromatic, the system controller 50 advances to a step S13 when the transfer of the single toner image BK is completed. If the document image is chromatic, it is when all the toner images BK, M, C and Y are transferred by four consecutive transferring operations that the system controller 50 advances to the step S13. In the step S13, the system controller 50 waits for the end of one copying cycle. As soon as one copying cycle completes, the system controller 50 increments a counter CN (step S14) and then compares it with a set number of copies CS (desired number of copies of each document) (step S15). If CN<CS, the program returns to the step S5 for effecting another copying cycle. If CN=CS, the system controller 50 clears the counter CN (step S16) and then checks the ADF 200 to see if any documents are left on the document table 210 (step S17). If the answer of the step S17 is YES, the program returns to the step S2 to start feeding the next document and then repeats the previously stated sequence of steps. When all the documents are reproduced, the system controller 50 returns to the step S1 to await the turn-on of the print start key.

In the illustrative embodiment constructed and operated as described above, the timing for starting feeding a document is also automatically switched over depending on the output of the color discriminating circuit 80. Specifically, when color documents are to be reproduced, a document feed signal appears every time a document is read four times × desired number of copies. On the other hand, in the case of black-and-white documents, a document feed signal appears every time a document is read once × desired number of copies. Hence, even a stack of documents which is the mixture of black-and-white and color documents, for example, can be reproduced simply by putting the stack on the document table 210 of the ADF. Concerning black-and-white documents, each can be copied once by a single image reading and transferring process and, therefore, the required copying time is short. Consequently, a mixed stack of black-and-white and color documents can be automatically processed without requiring the operator to pick up only color pages out of the stack, rearranging the pages, or feeding them by hand.

Figure 3A:
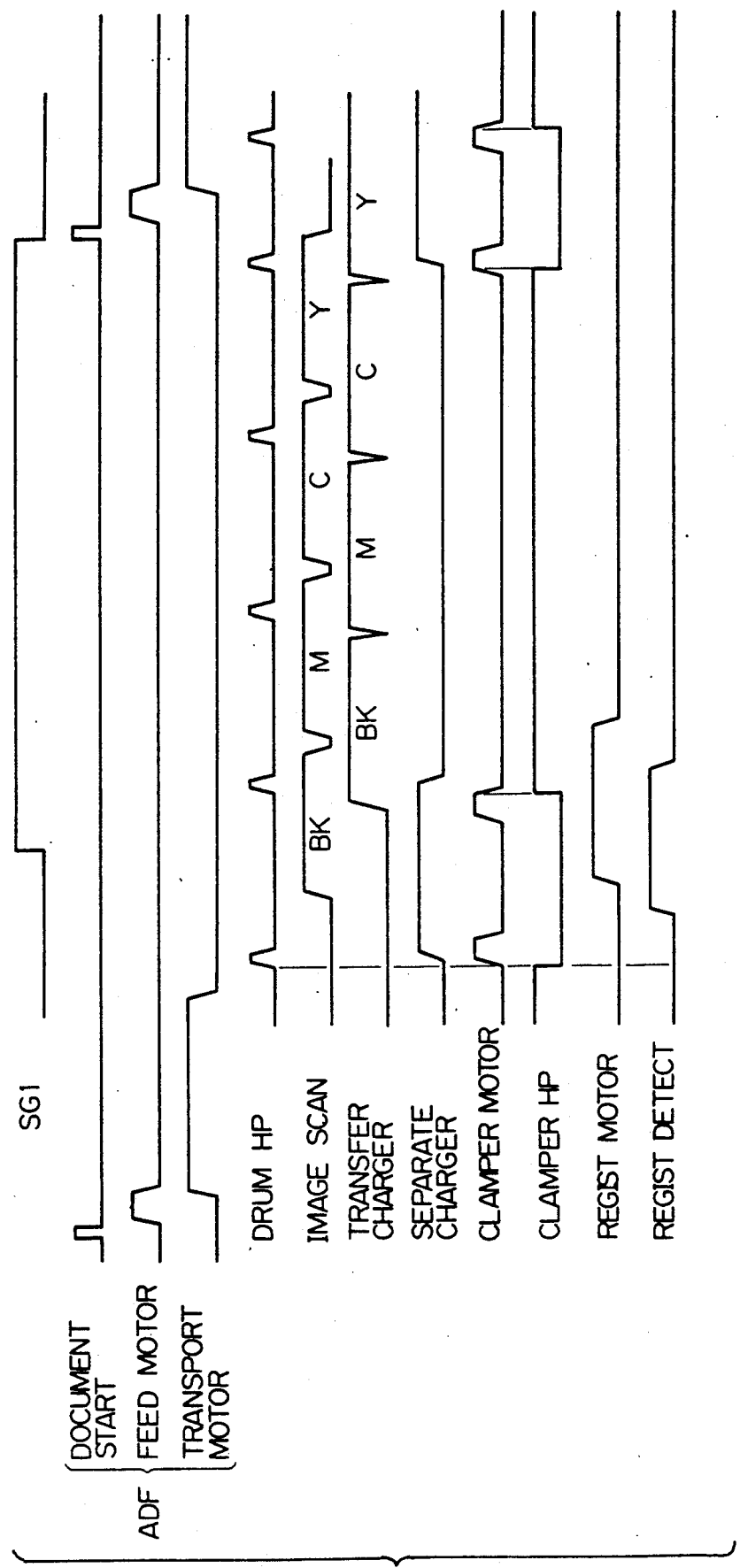
FIGS. 3A and 3B are timing charts demonstrating the operation timings of various sections included in the copier of FIG. 1.
Figure 3B:
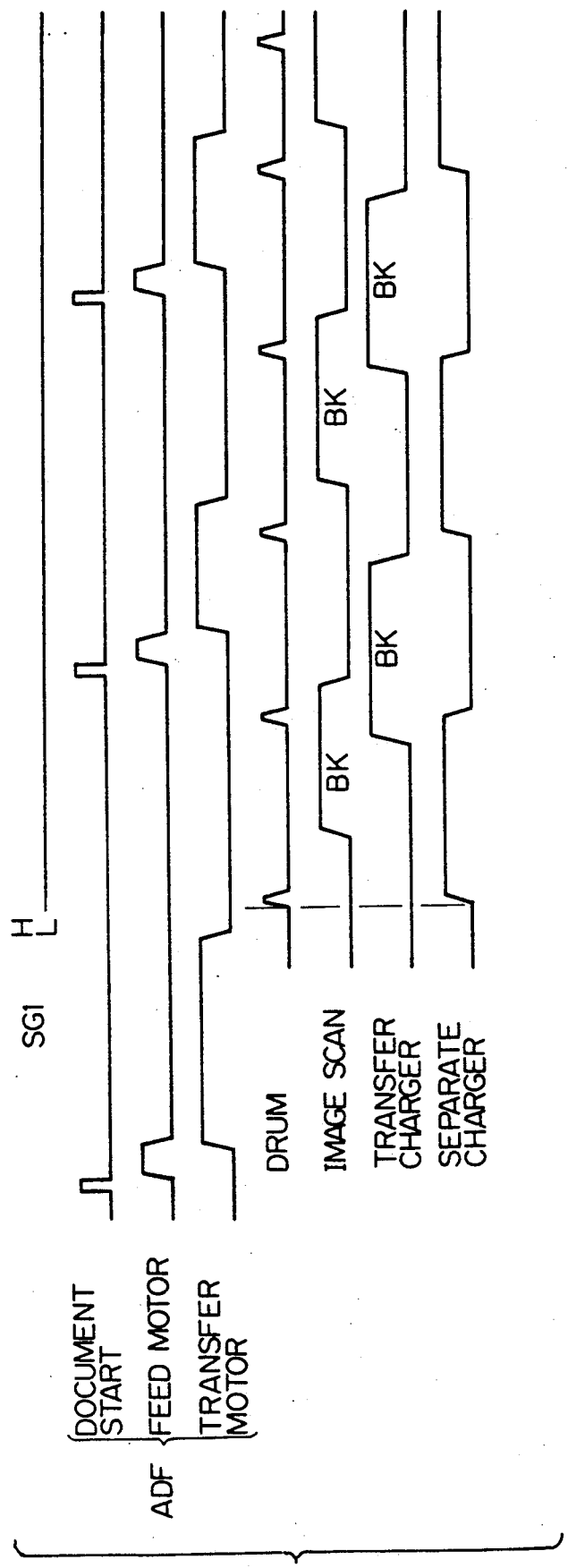

FIGS. 3A and 3B are timing charts demonstrating respectively a case wherein a document has a color image and a case wherein a document has only a black-and-white image.

In the illustrative embodiment, the procedure for reproducing a full-color image begins with black BK in order to allow the chromatic mode (four times of transfer) and the achromatic mode (single transfer) to share the first copying process. More specifically, since the first copying process is identical in both of the chromatic and achromatic modes, whether the document is chromatic or achromatic is determined while it is read during the first copying process and, depending on the result of decision, the subsequent operation mode is switched over. A document image, therefore, can be discriminated as to chromatic/achromatic without the need for an extra document reading operation (prescanning). A document image is read only four times in the chromatic mode and only once in the achromatic mode.

While the illustrative embodiment discriminates a document image as to chromatic/achromatic only, the color discriminating circuit 80 may be provided with an additional capability of determining whether or not a document image is monochromatic, i.e., C, M or Y. Then, if a document is chromatic and bears the hue of C, M or Y, it can be faithfully reproduced by a single reading and recording process. This is successful in minimizing the required copying time even with a chromatic document.

Figure 11B:
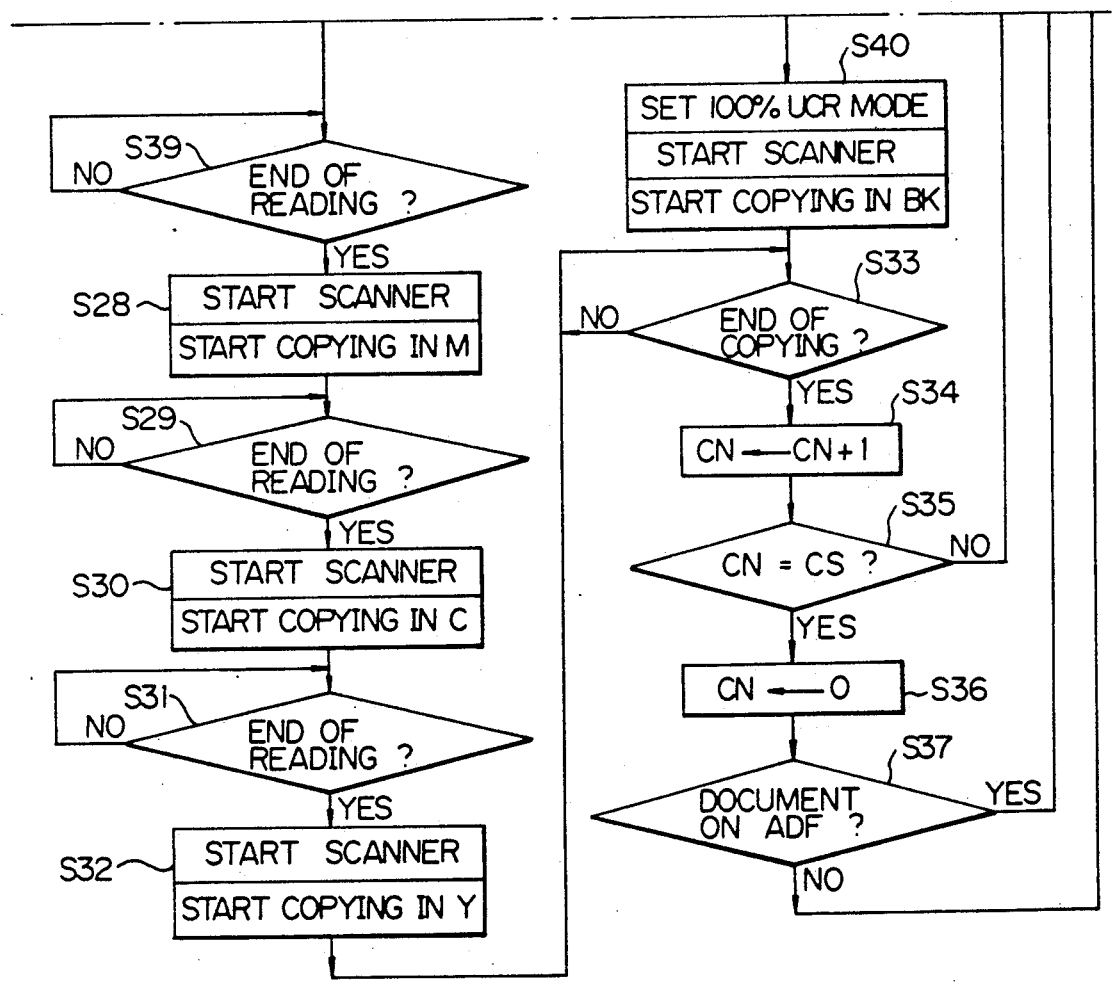
FIG. 11 is a flowchart showing the operation of a control device representative of a modified embodiment of the present invention.

FIG. 11 shows a sequence of steps representative of a modified embodiment of the present invention. In brief, this embodiment executes prescanning before an actual recording operation in order to see if a document image is achromatic, and it omits the shift of the background level particular to the previous embodiment. Hereinafter will be described only the modified part of this embodiment.

As shown in FIG. 11, when a document is to be read for the first time, a step S25 is executed to control the UCR black generating circuit 73 so as to set up the 100% UCR mode, and then to start a prescanning operation. At this instant, the recording system is held inoperative. On completion of the prescanning, the signal SG1 is referenced to see the result of discrimination (whether or not the document image is achromatic). If the document image is chromatic, the program advances to a step S38 for switching over the UCR mode to the skeleton black mode, causing the scanner to start reading the image, and starting recording in the color BK (black). Thereafter, the document image is sequentially reproduced in the colors M, C and Y, as in the previous embodiment. If the document image is achromatic as decided in a step S27, the 100% UCR mode is selected, the scanner begins to read the document, and the recording in the color BK begins (step S40). A single copying cycle terminates at the recording in BK.

This particular embodiment cannot discriminate a document image as to chormatic/achromatic unless it performs prescanning. Nevertheless, it has an advantage that when use is made of an achromatic document, even the portions where the density is low can be entirely recorded.

Although not shown or described, this embodiment changes over the contents of image processing depending on the result of discrimination as to chromatic/achromatic, as follows:
Achromatic image
image filtering: MTF correction, edge emphasis
tone processing: 64 levels, 8×8 pattern In summary, in accordance with the present invention, color discriminating means is inhibited from discriminating a document image as to chromatic/achromatic when edge detecting means has detected an edge of the image. This allows a minimum of color discrimination error to occur despite that the MTF deterioration characteristic of an image reading device depends on the color, i.e., R, G or B, and that an image is apt to deviate in phase due to the inaccurate positions of image sensors relative to each other.

Various modifications will become possible for those skilled in the art after receiving the teachings of the present disclosure without departing from the scope thereof.

What is claimed is:

1. A color image processing apparatus comprising:
    image reading means comprising spectral filter means for reading a visible image printed on a document sheet in a predetermined image reading area by scanning said image;
    color discriminating means for automatically determining whether or not the image is substantially monochromatic by processing image data produced by said image reading means and separated into a plurality of fundamental colors;
    edge detecting means for detecting edges of the image by processing the image data;
    discrimination inhibiting means for inhibiting said color discriminating means from operating when said edge detecting means has detected an edge of the image; and
    control means for automatically selecting and executing either one of color processing and monochrome processing in response to a result of discrimination by said color discriminating means.

2. A color image processing apparatus comprising:
    image reading means comprising spectral filter means for reading a visible image printed on a document sheet in a predetermined image reading area by scanning said image;
    image processing means interconnected to an output of said image reading means;
    color image recording means interconnected to an output of said image processing means and comprising a plurality of chromatic recording systems which are different in hue from each other and an achromatic recording system;
    undercolor removing means included in said image processing means for processing input image data to detect an achromatic color component contained in said image, extracting as achromatic color data a value of a predetermined ratio associated with said detected achromatic color component, and subtracting a value corresponding to said extracted achromatic color data from said input image data to output chromatic color data;
    color discriminating means for determining whether or not the image is substantially monochromatic by processing said chromatic color data outputted by said undercolor removing means;
    edge detecting means for detecting edges of the image by processing the image data;
    discrimination inhibiting means for inhibiting said color discriminating means from operating when said edge detecting means has detected an edge of the image; and
    control means for causing said image reading means to read a single document image a plurality of times;
    said control means fixing, during a fist image reading operation, said ratio of said undercolor removing means substantially to 100% and inhibiting said color image recording means from operating;
    said control means automatically and selectively conditioning said color image recording means to either one of a color processing mode and a monochromatic processing mode in response to a result of discrimination which said color discriminating means produces with image data resulted from said first image reading operation.

3. A color image processing apparatus comprising:
    image reading means comprising spectral filter means for reading a visible image printed on a document sheet in a predetermined image reading area by scanning said image;
    image processing means interconnected to an output of said image reading means;
    color image recording means interconnected to an output of said image processing means and comprising a plurality of chromatic recording systems which are different in hue from each other and an achromatic recording system;
    background removing means included in said image processing means for correcting tone of input image data and removing a set background level from said image data;
    undercolor removing means included in said image processing means for processing image data outputted by said background removing means to detect an achromatic color component contained in said image, extracting as achromatic color data a value of a predetermined ratio associated with said detected achromatic color component, and subtracting a value corresponding to said extracted achromatic color data from said input image data to output chromatic color data;
    color discriminating means for determining whether or not the image is substantially monochromatic by processing the chromatic color data outputted by said undercolor removing means;
    edge detecting means for detecting edges of the image by processing the image data;
    discrimination inhibiting means for inhibiting said color discriminating means from operating when said edge detecting means has detected an edge of the image; and
    control means for setting, when said image reading means reads a single document image for the first time, a first background level in said background removing means, fixing said ratio of said undercolor removing means at substantially 100%, and in this condition causing said color image recording means to record an achromatic color component of the image;
    said control means setting, if a result of discrimination by said color discriminating means resulted from the first image reading operation is not monochromatic, a second background level in said background removing means, setting said ratio of said undercolor removing means such that said ratio is zero if tone is lower than a tone substantially the same as said first background level and has a predetermined value if otherwise, and in this condition executing a second and successive reading operations while conditioning said color image recording means for a recording mode for recording chromatic color components.

4. A color image processing apparatus comprising:
    image reading means comprising spectral filter means for reading a visible image printed on a document in a predetermined image reading area by scanning said image;
    color discriminating means for automatically determining whether or not the image is substantially monochromatic by processing image data outputted by said image reading means and separated into a plurality of fundamental colors;

edge detecting means for detecting edges of the image by processing the image data;

discrimination inhibiting means for inhibiting said color discriminating means from operating when said edge detecting means has detected an edge of the image;

automatic document feeding means loaded with a plurality of document sheets each carrying a visible image thereon for feeding said document sheets one by one to said predetermined image reading area of said image reading means; and control means for switching over, on the basis of a result of discrimination by said color discriminating means, correspondence between the number of times that said image reading means scans a document sheet and the number of times that said automatic document feeding means feeds a document sheet.

* * * * *